United States Patent [19]
Brent et al.

[11] Patent Number: 5,459,864
[45] Date of Patent: Oct. 17, 1995

[54] LOAD BALANCING, ERROR RECOVERY, AND RECONFIGURATION CONTROL IN A DATA MOVEMENT SUBSYSTEM WITH COOPERATING PLURAL QUEUE PROCESSORS

[75] Inventors: Glen A. Brent, Red Hook; Thomas J. Dewkett, Staatsburg, both of N.Y.; Christine R. Panner, Austin, Tex.; Casper A. Scalzi, Poughkeepsie, N.Y.

[73] Assignee: International Business Machines Corporation, Armonk, N.Y.

[21] Appl. No.: 12,187

[22] Filed: Feb. 2, 1993

[51] Int. Cl.⁶ .............................. G06F 15/16; G06F 13/00
[52] U.S. Cl. ...................... 395/650; 395/700; 364/230.3; 364/281.0; 364/281.9
[58] Field of Search ................................................ 395/650

[56] References Cited

U.S. PATENT DOCUMENTS

| | | | |
|---|---|---|---|
| 4,320,455 | 3/1982 | Woods et al. | 364/200 |
| 4,590,554 | 5/1986 | Glazer et al. | 364/200 |
| 4,633,387 | 12/1986 | Hartung et al. | 364/200 |
| 4,912,707 | 3/1990 | Kogge et al. | 371/12 |
| 5,168,555 | 12/1992 | Byers et al. | 395/325 |
| 5,239,649 | 8/1993 | McBride et al. | 395/650 |
| 5,301,309 | 4/1994 | Sugano | 395/575 |

OTHER PUBLICATIONS

IBM Technical Disclosure Bulletin, "I/O Load Balancing Using Device Connection Timings", vol. 24, No. 3, Aug. 1981, p. 1411.

*Primary Examiner*—Kevin A. Kriess
*Assistant Examiner*—Matthew M. Payne
*Attorney, Agent, or Firm*—Bernard M. Goldman

[57] ABSTRACT

Provides load balancing, recovery and reconfiguration control for a data move subsystem comprised of a plurality of interconnected and cooperating data move processors (DMPs). Each DMP processor has an associated queue for receiving queue elements (QEs) from central processing units of a data processing system which specify data move requirements of the data processing system. QEs can be transferred between queues of other DMPs or a common queue to achieve load balancing, recovery and reconfiguration control.

7 Claims, 12 Drawing Sheets

FIG. 3

```
LOCK
SUBCHANNEL ID
TYPE
BUSY ID
CURRENT Q ID
CURRENT Q CHAIN PTR
ASSIGNED Q ID
CHECKPT SUBUNIT DATA
CHANNEL PROGRAM ADDRESS
STATUS
```

FIG.4A

```
LOCK
ENABLE
RETRY COUNT
TOP Q PTR
BOT Q PTR
```

FIG.4B

```
LOCK
QOP0 BUSY PTR
QOP1 BUSY PTR
    •
    •
    •
QOPy BUSY PTR
TOP Q PTR
BOT Q PTR
```

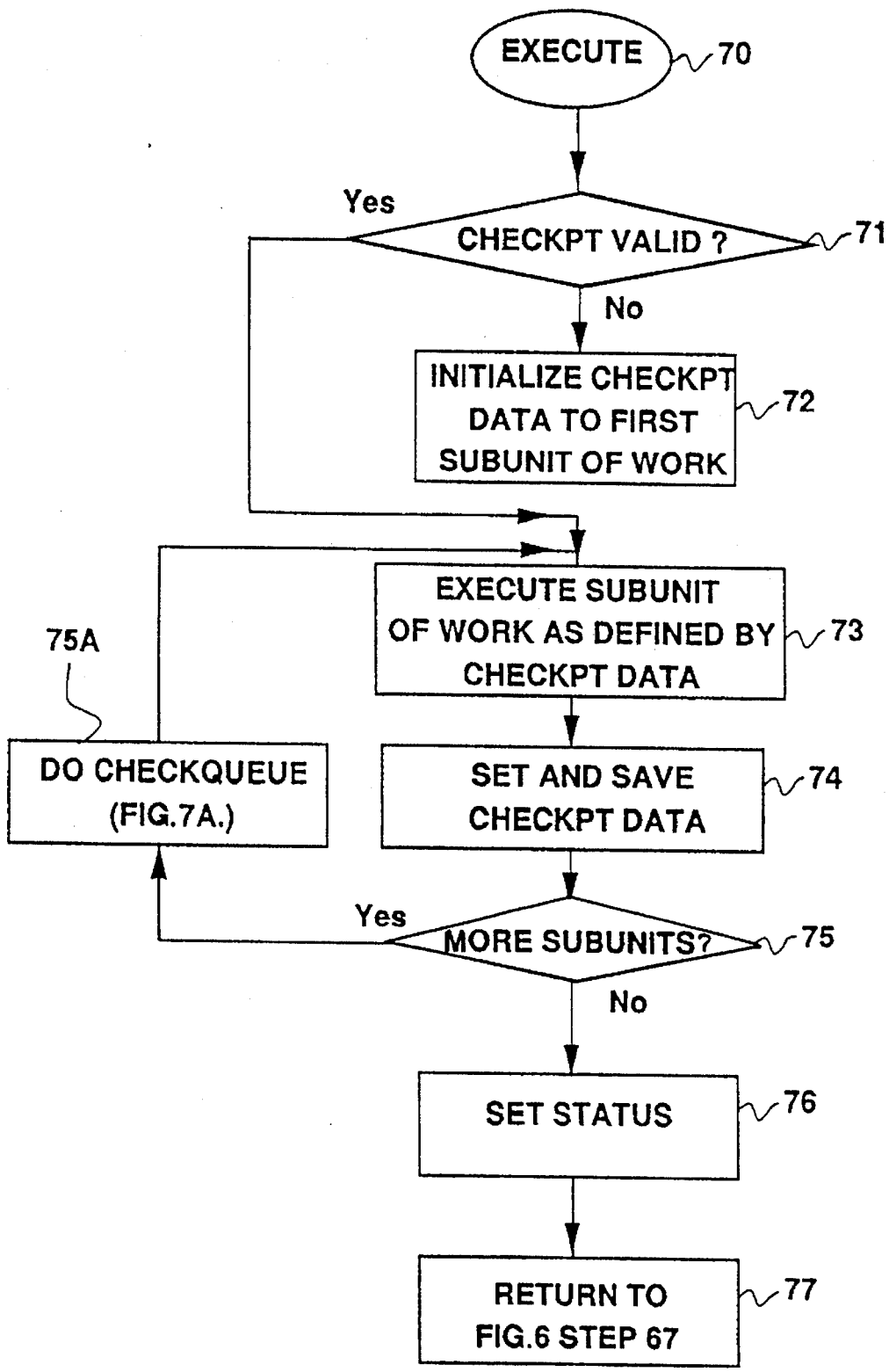

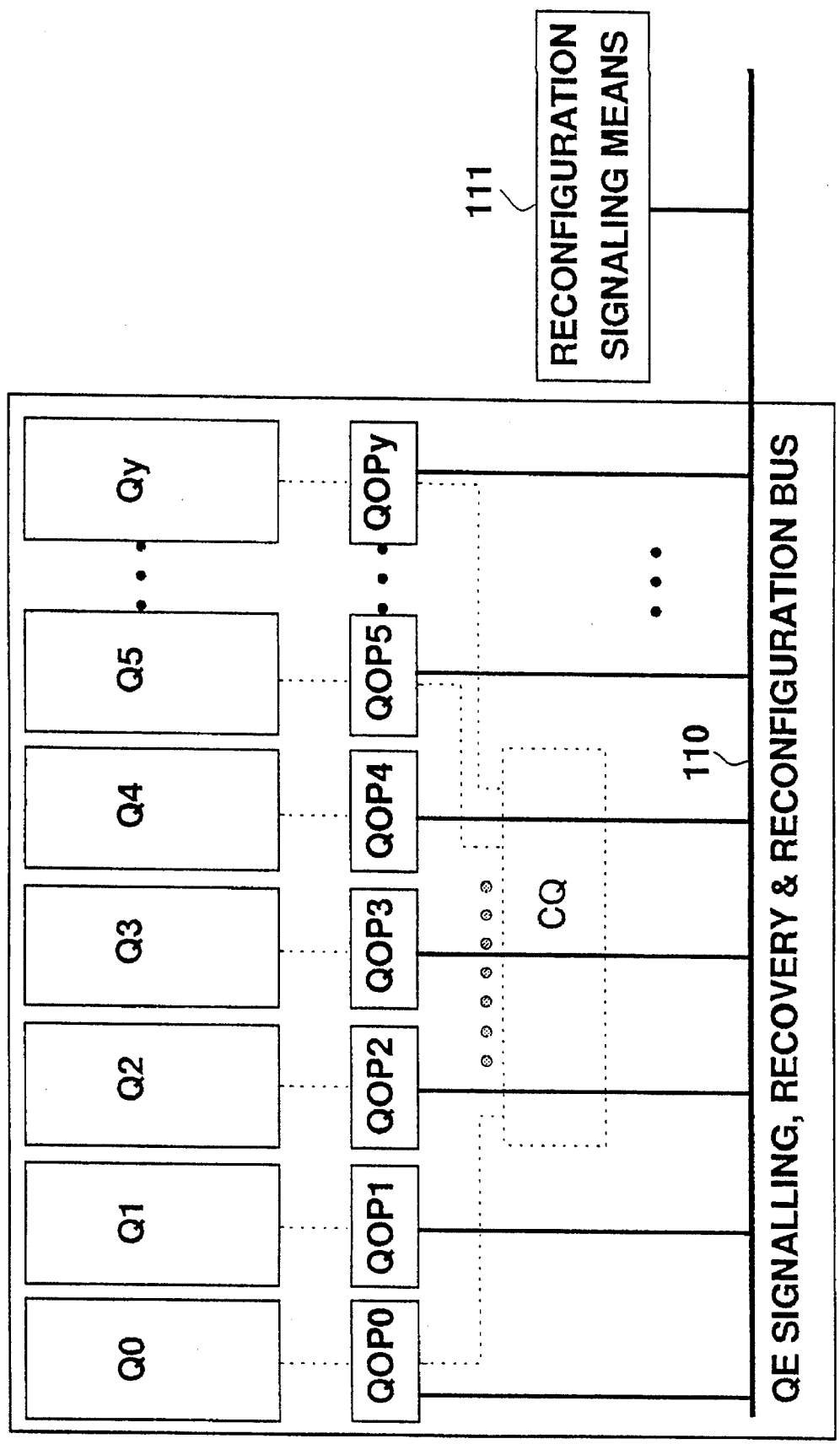

LOAD BALANCING, ERROR RECOVERY, AND RECONFIGURATION CONTROL IN A DATA MOVEMENT SUBSYSTEM WITH COOPERATING PLURAL QUEUE PROCESSORS

INCORPORATION BY REFERENCE

This specification incorporates by reference the entire specification and drawings of U.S. patent application Ser. No. 07/816917 (PO9-90-030), filed Jan. 3, 1992, entitled "Asynchronous Co-processor Data Mover Method and Means", and assigned to the same assignee as the subject application.

INTRODUCTION

The invention provides automatic load balancing among plural queue processors, automatic recovery from any failing queue processor, and automatic reconfiguration for the subsystem containing the processors, while the subsystem continues to control data movement within or between electronic storage media without intervention from the operating system.

BACKGROUND

Prior computer systems have used plural input/output processors (IOPs) having dedicated work queues (WQs) to manage CPU requests for data movement between I/O devices and computer memory. Each IOP WQ operates with a subset of I/O devices using corresponding subchannel ID numbers. Each subchannel ID number is represented internally by a queue element (QE) in Protected System Storage and is assigned to use one or more of the IOP WQs depending on the paths associated with the device the subchannel represents. The I/O devices are accessed through various physical paths, in which some of the I/O devices may be accessed through more than one path. Each path to an I/O device is through an I/O channel and a control unit (CU), and may include I/O path switches. Each IOP and associated WQ have access to a subset of paths and as a result can only service QEs with certain paths.

The IOPs manage the I/O workload requested by the CPUs in a system. Any CPU executes a start subchannel (SSCH) instruction to put a work request on an IOP WQ. Each CPU request on a WQ comprises a queue element (QE), which is a control block representing the I/O device to be started and specifying the data move information. An I/O request cannot be executed until the physical path to the requested I/O device becomes available, which includes different channel processors to control different physical paths. Thus, a request waits if any component in its physical path is busy. If a control unit (CU) of the physical path to an I/O device is not available, the request (QE) is moved from its WQ to a Control Unit Queue (CUQ), on which the QE is parked until the CU becomes available; and then the request is moved back to its assigned WQ from which it is given to by the channel processor for its path and the channel processor controls the I/O operation.

When any I/O operation is completed, the assigned IOP generates a pending I/O interruption by: moving that QE to an interruption queue (IQ) assigned to that subchannel, and sending an interruption signal to all CPUs in the system. The first CPU available for interruption looks at the Iqs and may handle one or more pending interruptions. Each QE is assigned to use one of eight IQs associated with an interruption subclass indicated in the subchannel. The IOP subsystem redistributes work among certain of its WQs, only when multiple paths have been defined in the subchannel to access a device, the path on one WQ is busy or becomes unavailable, and a path is available on another WQ. The prior IOP subsystems do not move QEs among different WQs for utilizing idle IOPs. The prior subsystems required the WQ and IOP assigned to a subchannel to handle the QE when it is a request on any WQ. A QE could not be moved to another WQ for continuing uninterrupted execution of the QE if the IOP dedicated to the assigned WQ is busy or is failing unless the I/O operation had not begun in the channel and an alternate path also exists on another IOP. The IOPs could only be reconfigured as a group (when an associated part of a computer system was reconfigured) by removing that entire group from the computer system. If alternate paths are not available, the operation is terminated. Thus, the prior art IOP WQs and their IOPs were not used for workload balancing, recovery, or reconfiguration.

In prior computer systems, if only one path is provided for a subchannel, the QE associated with that subchannel ID must wait on its assigned WQ while its assigned path is busy, or wait in a Control Unit Queue (CUQ) while its I/O control unit is busy. Because different subchannels use different CUQs, the CUQs cannot serve as a central point for balancing IOP queue work. Accordingly in the prior art, a QE work request could only use the WQ permanently assigned to the subchannel. If a large number of Start Subchannel instructions (work requests) from one or more CPUs are directed to the subchannels assigned to a particular WQ, all of those work requests must use that WQ, even if one or more other WQs and their associated processors are empty and idle. Hence, the workload may become highly out-of-balance among the WQs in the prior IOP subsystems. Also in the prior art, if any IOP fails, a catastrophic condition exists, and the I/O requests on that IOPs WQ are put on a termination queue and terminated if alternate paths are not available or if the I/O operation had begun in the channel. Manual intervention may be required to enable new paths to allow the CPUs to bypass the failed WQ and its associated IOP, to reassign the subchannels to other operational WQs, and then to re-execute the CPU software from some prior point in an interrupted application program to repeat the CPU requests, in order to repeat the terminated I/O requests on newly-assigned operational WQs.

SUMMARY OF THE INVENTION

The primary objects of this invention are to provide workload balancing, recovery and reconfiguration internal to a subsystem performing processes offloading from the main processors of a computer system. An example of such is the ADM (Asynchronous Data Mover). This invention requires multiple processors in an offload subsystem of a computer system.

The subject invention manages processes used by a plurality of processors to efficiently and continuously perform subunits of work (e.g. transferring pages of data) between a source location in an electronic memory and a destination location in the same or another electronic memory, utilizing the ADM processes and means disclosed in U.S. patent application Ser. No. 07/816917 (PO9-90-030), incorporated by reference. Application Ser. No. 07/816917 describes an ADM co-processor comprising a single processor for executing an ADM CCW program. The CPU interface to an ADM uses the S/390 start subchannel (SSCH) instruction. A special ADM subchannel is used to request an ADM operation. The CPU may perform other work while the ADM subsystem performs a CPU request to move any number of CPU requested pages from a source location in an electronic memory to a destination location in the same or in another electronic memory. The subsystem has multiple ADM processors, associated queues, a common queue, and control logic. The multiple ADM processors can simultaneously execute multiple CPU requests requested through multiple ADM subchannels. Any ADM subchannel and its associated QE can deliver an ADM request to the subsystem. Any of the ADM processors is capable of performing any received ADM subchannel request made by any CPU of a computer system (CEC). GR1 (general register 1) contains an implicit operand of the SSCH instruction which is a SCH ID (subchannel identifier) number that identifies a subchannel and its associated queue element (QE). A Queue Element is a microcoded control block which represents the Subchannel ID in internal microcode interfaces. This QE is used by a CPU as a "mail package" to carry a CPU request to a subsystem that executes the request.

Another operand of the SSCH instruction locates the first ADM CCW (Channel Command Word) of an ADM program comprised of one or more ADM CCWs. Each ADM CCW specifies a list of MSBs (move specification blocks) in the memory of the computer. Each MSB specifies a source specification and a sink specification. The source specification specifies a starting address of a source location for any number (in a page count field) of contiguous pages of data(e.g. 4 KB/page) in memory. The sink specification contains the starting address of a destination location in memory for receiving the contiguous pages copied from the source location. The CPU can do other work while the ADM subsystem handles the CPU request information, and controls the transfer of a potentially vast number of data pages in or between the electronic memory(s). After all pages of a CPU request have been transferred by the ADM subsystem, it sends an I/O type of interruption to all CPUs to inform them of the completion of the CPU instruction. All CPUs receive the interruption signal and one of them will accept it under existing ES/390 Architecture rules.

This invention enables an ADM subsystem to continuously handle a very large number of CPU requests utilizing automatic ADM load balancing, automatic recovery from any failing processor without interruption to the ADM processing, and automatic reconfiguration of one or more processors within an ADM subsystem. The ADM load balancing, recovery, and reconfiguration functions are each transparent to CPU processing and to operating system software.

Furthermore, the invention allows a computer system to use the same CPU interface to the workload-balancing ADM subsystem as is currently used by the CPU's to interface the I/O subsystem having IOPs and WQs. The invention uses this interface compatibility characteristic to combine the ADM subsystem operations and the I/O subsystem operations into a single subsystem which performs both types of operations and may share the same set of work queues. Thus in the combined subsystem, the queues can hold both ADM and I/O requests, and each queue-offload processor (QOP) performs both ADM functions and IOP functions. However, a common queue (CQ) in a combined subsystem is used only for the ADM operations.

In a combined subsystem, when a queue processor is processing an I/O request, it is operating as a conventional IOP, and when the queue processor is processing an ADM request, it is operating as a ADM processor.

However, the ADM and I/O functions may be provided in separate subsystems (an ADM subsystem and an I/O subsystem) within the same computer system. But, in general, it has been found cost effective in current systems to provide a combined subsystem in which the processors and queues are shared by both the ADM and I/O requests.

Also, in a combined system I/O requests are given higher processing priority than the ADM requests on each queue, because the I/O requests require very little processor time, since the I/O requests are not processed by queue-associated processors (I/O requests are processed by a different processor—a channel processor that controls the I/O data move operation). On the other hand, ADM requests are entirely controlled by the queue-associated processors, and no other processor is used. This extra use of the processors by the ADM requests causes the average ADM request to take much more processor time than any I/O request, so that more of the processor time may be consumed by ADM work—even when I/O traffic is high. However, I/O requests may be processed between ADM subunits of work.

Accordingly, when ADM operations are described herein in the preferred embodiment as being processed by a QOP (a queue-associated processor), it is to be understood that the QOP need not be dedicated to only ADM operations, but the QOP also may be performing conventional I/O operations on the same queue.

The invention provides novel processes for managing CPU requests for ADM service, which are managed differently from I/O requests handled by the same hardware processors. The same hardware processors execute different processes for ADM and I/O requests.

Thus, the invention supports data control subsystems that may either use separate sets of queues and queue processors for ADM and I/O requests, respectively, or use the same set of queues and queue processors for both ADM and I/O requests.

The ADM subchannels, unlike the I/O subchannels, do not have any path restrictions. Any ADM processor can access any path in or between the electronic storages to allow complete flexibility among all ADM queues and ADM processors to handle an ADM request from any CPU, allowing all of the electronic storage(s) to be accessible by any request through any ADM subchannel. On the other hand, I/O subchannel path controls require the I/O processors to pass the I/O request to an I/O processor that has one of the specified paths available. The request is then given to the path processors (channel processors) to complete the I/O operations. The elimination of path controls for ADM operations allows the ADM processors to complete ADM operations without requiring any path processors.

Two levels of workload balancing are provided by this invention. The initial workload balancing effort has the ADM subsystem distributing the CPU requests evenly among the ADM processors. The ADM subsystem controls the assignment of a particular ADM request to a particular ADM processor. The final level of workload balancing is provided within the subsystem. The CPU requests may vary widely in their subsystem execution times, since any request can vary from a single data transfer to an extremely large number. As the workload execution proceeds within the subsystem, the actual workload variations are completely balanced by the work being continuously moved from busy ADM processors to idle ones to keep all ADM processors continuously busy as long as requests exist in the subsystem. With either separate or shared queues and processors, if a queue-associated processor is not busy when its queue receives an ADM request, the processor immediately performs the ADM request. If a queue-associated processor is busy when its queue receives an ADM request, this invention provides ADM workload balancing by having the busy processor transfer the waiting ADM request to the queue of any other processor which is not busy and that processor then immediately performs the ADM request. When all queue-associated processors are busy, and any queue receives an ADM request, the associated processor pauses between subunits of work to move the ADM request to a common queue (CQ). The CQ is serviced by all queue-associated processors when each processor completes a request and looks for a new work request to perform. The processor looks at the CQ header to find if the CQ is empty; if the CQ is not empty, that processor will immediately move a waiting ADM request from the CQ to that processor's queue, from which it may be executed.

Accordingly, the invention continuously redistributes waiting ADM requests among its queues and processors to assure that all ADM requests are quickly executed by the queue-associated processors. Hence, an ADM request may have its execution completed long before its queue-associated processor would have become available for processing it, because an ADM request is immediately executed by any available processor, or it may have a minimal wait on the common queue while all processors are busy, until it is performed by the first processor to become available. This redistribution of work requests provides complete workload balancing for all ADM requests. There is almost no interference with I/O requests being handled by the same queues and processors, since an I/O request placed on a queue is handled by the queue-associated processor as soon as the current subunit of work is completed.

Further, this invention provides an ADM recovery feature for each QE when it is used as an ADM request on a queue. The ADM recovery feature is provided by a checkpointing field in the QE and by a recovery process for using it. The checkpointing field retains information in the QE for locating the last page successfully moved by a failing processor while executing an ADM request. If a failure occurs to any processor while performing any page move operation, it signals its failing state and identifier to all other queue-associated processors. The first queue-associated processor to detect the failure signal becomes a recovery processor by accepting the failure signal. The recovery processor resets the failing processor, adds one to its associated queue header retry count, tests that count against the maximum allowable retry count, and if less, establishes conditions allowing the failed processor to retry the operation from its last successfully completed subunit of work. Otherwise, the failing processor is stopped, removed from the operational subsystem, and its work redistributed to other processors through the subsystem workload balancing process.

In trying to recover, the recovering processor accesses the checkpointing field in the QE being handled by the failing processor and uses data in the checkpointing field to reestablish execution of the incomplete ADM request from its last successfully completed subunit of work until the request is successfully completed. If the failing processor cannot be recovered, the QE element is placed on the associated queue of the recovery processor which may subsequently complete the work request, or put it on the CQ to be completed by the first processor that finishes an ongoing request. In any case, the operation is begun from the checkpointed state. This differs from I/O handling since any ADM QE on any associated queue, or in execution, can be performed to successful completion by any processor in the subsystem. When a processor is removed by the recovery process, the QEs are searched to determine and change, where necessary, the queue assignment for new requests (made by a CPU) to the queues remaining after the recovery.

The recovery feature enables full recovery of the ADM operations in a manner transparent to the rest of computer system outside of the subsystem, and without interruption to the work being done by the subsystem. A slight slowdown in the subsystem operations may occur during high request loads, since the subsystem may then be operating with fewer processors.

This invention also provides an ADM dynamic reconfiguration feature available for use at any time to allow any processor to be removed, or a new processor to be added, to the subsystem, as long as there is at least one operational processor remaining in the subsystem. Reconfiguration involves a re-assignment of QEs to the queues and their processors remaining after the reconfiguration. This invention marks the header of each queue being removed (for a processor being removed) in a reconfiguration operation by setting an enabled field to a disabled state. Any pending requests (QEs) on the disabled queue are moved to other queues remaining operational (including the common queue). The QE move operation may be done by a processor assigned in a reconfiguration command as the reconfiguration processor for handling that command. Also, this invention marks the header of each queue being added (for a processor being added) in a reconfiguration operation by setting the enabled field to an enabled state.

The reconfiguration process requires a queue-associated processor to search through all QEs to determine and change, where necessary, the queue assignment(s) to the queues remaining after the reconfiguration. In the case of a processor being logically removed from the subsystem (the deleted processor), its queue is also removed and the reconfiguration processor re-assigns QEs of the deleted processor to remaining processor queues. In the case of an added processor queue, the subsystem may re-assign some of the QEs from the prior existing queues to each new processor queue. The workload balancing feature that increments associated Q ID and the feature that assigns work to idle processors will assign pending QEs to the added processor.

In this manner, ADM requests are redistributed to operational processor queues and to the common queue without any involvement being required by other parts of the computer system, or by any software in the computer system (including no required involvement by a software operating system), in performing the work load balancing, recovery and reconfiguration operations of this invention.

DESCRIPTION OF THE DRAWINGS

FIG. 3 represents important fields in a queue element which is a microcoded control block associated with a subchannel.

FIG. 4A shows fields used by the embodiment in a header of each processor queue.

FIG. 4B shows fields used by the embodiment in a header of a common queue (CQ).

FIG. 7 is a flow chart of a "do execute" subprocess in the workload balancing process in FIG. 6.

FIG. 11 shows a bus connecting among queue processors in the subsystem. The bus is used for signalling in the workload process, in the recovery process, and in the reconfiguration process of the preferred embodiment.

DETAILED DESCRIPTION OF THE EMBODIMENTS

Figure 1:
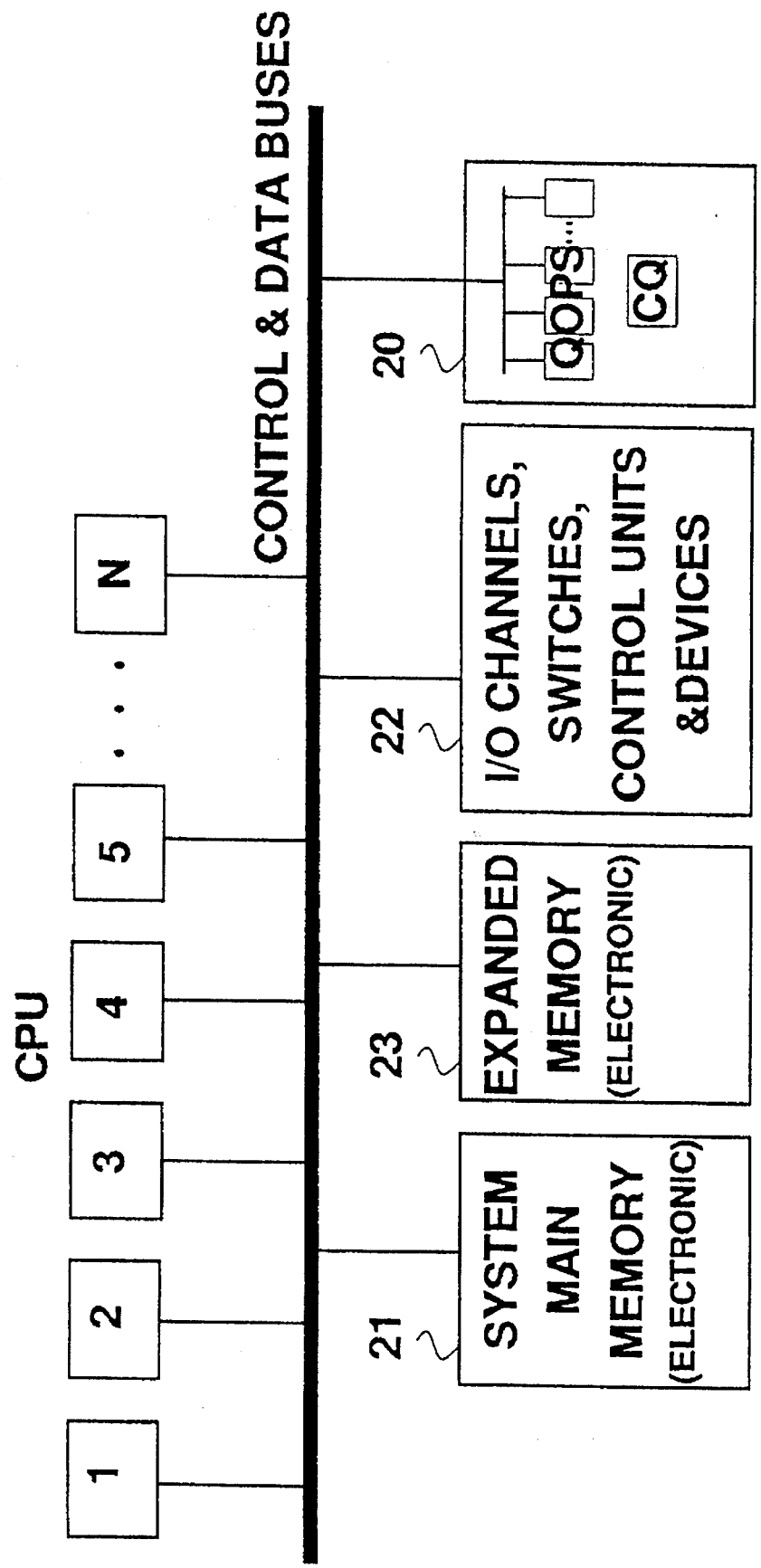
FIG. 1 illustrates a computer system structure containing an embodiment of the invention.

CPU Operations—FIG. 1:

FIG. 1 shows a computer system containing a CPU offload subsystem 20, which offloads asynchronous data-move management operations from a plurality of CPUs 1 through N to a subsystem 20, which moves pages of data within and between electronic memories 21 and 23, and an I/O subsystem 22 that includes I/O channel paths, I/O control units and I/O devices. The memory 21 is a system main memory 21 (sometimes called MS), and memory 23 is an expanded storage (sometimes called ES).

Each CPU uses the S/390 start subchannel (SSCH) instruction to put a queue element (QE) assigned to the subchannel on a subsystem queue. The SSCH instruction operates in the manner disclosed in IBM publication entitled "Enterprise System Architecture/390 Principles of Operation" having form no. SA22-7201 for I/O requests, and for ADM requests operates in the manner disclosed and claimed in patent application Ser. No. 07/816917 (PO9-90-030), previously cited.

For both I/O and ADM requests, the CPU execution of the SSCH instruction accesses an ORB (Operation Request Block) specified by second operand. GR1 specifies the subchannel ID number. The SSCH instruction invokes microcode in its CPU that accesses the queue in subsystem 20 assigned to each identified subchannel, and chains subchannel-associated QE into the queue assigned to the QE using the priorities disclosed herein in the respective queue. Fields in the header of the queue are set to the address of the current bottom (last) QE in its queue, and the address of the current top (first) QE in the queue.

Each QE in any queue represents a "unit of work" to subsystem 20, which is a request to the QOP associated with the queue containing the QE to transfer an indicated number of pages between source and destination addresses identified in the QE.

The execution of the SSCH instruction is completed after the accessed QE is chained as the last QE in the identified queue, nd after the CPU sends a signal to the associated QOP that a new queue element (QE) has been chained into its queue. If the QOP is then not busy, it will immediately access the first QE on its associated queue (in the preferred embodiment) and begin executing it. If the new element is the only element on its queue, the signalled QOP accesses the new QE to obtain its next unit of work. If the QOP is busy, it will discover the new request by testing after completing each subunit of work.

Figure 2:
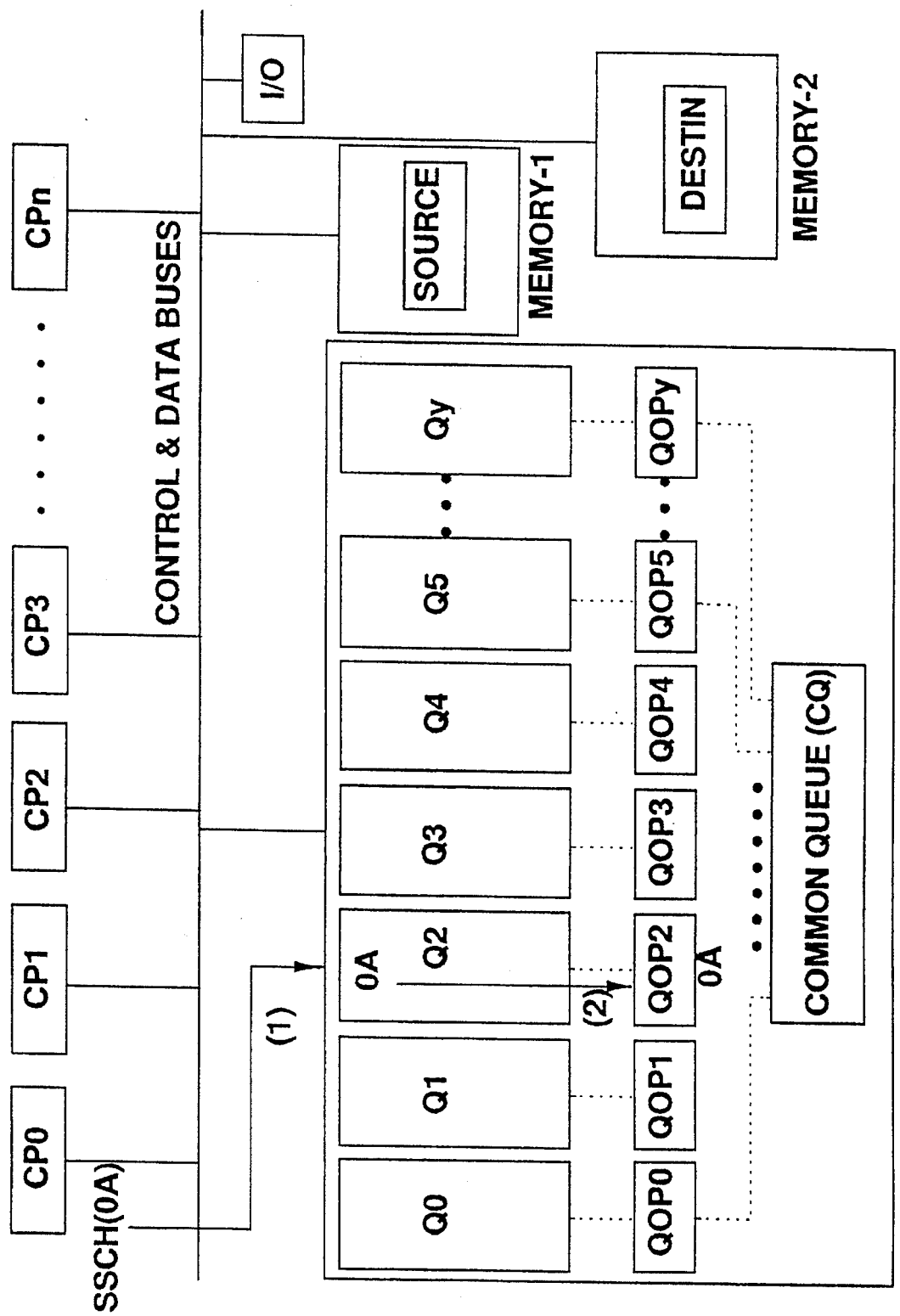
FIG. 2 is a multiple queue subsystem representing a preferred embodiment of the invention within a computer system.

Subsystem Operations—FIGS. 1 & 2:

Subsystem 20 in FIG. 1 includes a set of queue-offload processors (QOPs), QOP associated queues (hereafter called "QOP queues), and a common queue (CQ). The CPUs put requests on the QOP queues, and the QOPs take the requests off their respective QOP queues and execute them or move them to other queues. Each CPU request is put on a queue in the form of a queue element (called a QE) which is chained (addressed) into a queue. An ADM or I/O request from a CPU may chain a subchannel into a queue as a queue element (QE). Thus, the QOPs are offload subsystem processors which perform asynchronous data move processes in response to CPU requests put into the queues. A CPU request may be an I/O request, or an ADM request for moving N number of pages within or between electronic memories 21 and 22. That is, each QOP performs one or more processes required by each received CPU request, whether they are I/O processes or ADM processes. The ADM processes performed by the QOPs include ADM execution control, load balancing, recovery and reconfiguration.

Subsystem 20 is shown in more detail in FIG. 2. Each queue element has a field set by initialization to indicate whether the requested subchannel operation represents an I/O or ADM request. The CPUs put the I/O and ADM requests at the bottom of each QOP queue. Each QOP finds its next work unit by accessing the QE located by the address in the "Top Q PTR" field in the header of its associated queue. A unit of work is represented by either an I/O or ADM QE chained in a queue. A queue is empty if its "Top Q PTR" field contains the address of its header. If not empty, the processor accesses the QE at the top of its queue, and changes content of the "Top Q PTR" field to the address the next QE in the queue. If there is no next element, the processor writes in the header address. The current work unit is unchained from any queue when it is to be performed.

When the QOP completes an I/O request or a unit of ADM work (in other words completes an entire ADM request), the QOP looks at the CQ header to see if the CQ is empty. If the CQ is not empty, the QOP moves the top QE in the CQ to the top of the QOP's queue and returns to queue processing. If a QE is moved, or if no QE is on the CQ, the QOP looks at its queue header to see if it is empty. If the queue is not empty, the QOP executes the QE at the top of its queue. All new CPU requests are put at the bottom of the queue. This manner of putting and taking QEs on and from each queue maintains the priority of execution of the QEs in any queue, attempting to service them as close to arrival order as possible.

The I/O processes performed by the QOPs are the conventional IOP (I/O processor) processes performed by conventional IOPs found in the IBM mainframes, such as in the IBM ES/9000 M900 system, and in prior S/3090 systems.

The ADM processes performed by the QOPs are the primary subjects of this invention. The common queue (CQ) in subsystem 20 is used only for ADM processes and is usable by all QOPs.

A QOP checks for pending ADM or I/O requests after it completes a work unit, and after it completes each work subunit while performing a work unit. It checks its queue by looking at its header to see if any new request(s) were put on its queue. If it has any new request, it checks if it is an I/O type or an ADM type. If an I/O type, it handles the CPU request by transferring it to a channel processor and returns to ADM work on the subsystem queues.

If the new request is an ADM type, the QOP tries to pass the new request to an idle processor, if it can find one. It does this by checking the QOP busy pointers in the CQ header to determine if there is an idle QOP. Then, the checking QOP transfers the new ADM request (QE) from the top of its queue to the bottom of that idle QOP's queue, and signals the idle QOP. If the checking QOP does not find any idle queue, it enqueues its new ADM request on the CQ, and returns to its processing. The checking QOP then continues processing whatever it was processing when it paused. When any QOP becomes idle, it then checks the CQ header for an empty state. If the CQ is not empty, the QOP takes the top CQ request and moves it to the top of its queue where it will be taken as its next work unit. If the CQ is empty, it next checks its own queue for work. If there is none, the QOP goes into wait state.

QOP operations:

Normally, the QOP dequeues the top subchannel QE in its associated queue and executes the QE to perform a unit of work. The QE execution transfers a specified number of subunits of data between the two locations specified in the queue element, which may be addresses in the same electronic storage medium or in two different electronic storage media in the system. These operations follow the teachings in application Ser. No. 07/816917 (PO9-90-018). For example, a "unit of work" may be the transfer of 10,000 pages of data between MS and ES, or the transfer of 38 pages of data between two locations in MS. Each page transfer is an example of a "subunit of work". A unit of work is equal to a subunit of work only when the unit of work specifies a single subunit transfer.

A QOP pauses after it completes each subunit of work. During the pause, the QOP looks at its top queue pointer in its queue header to see if it indicates any QE is waiting in its queue. If a waiting ADM QE is indicated, the paused QOP momentarily switches from its subunit transfer operations to find any non-busy QOP in the subsystem. If a non-busy QOP is found, the paused QOP moves the waiting QE to the non-busy QOP queue, and signals the non-busy QOP that it has a QE on its associated queue. If the paused QOP finds all QOPs are busy, it moves the waiting QE to the bottom of the common queue (CQ).

In normal processing if no work exists in the CQ or associated queue, the QOP remains idle until it is signalled either that an I/O or ADM QE has been put on its queue.

The load-balancing redistribution of ADM Qes among QOP queues and the common queue keeps all QOPs continuously busy as long as the CPUs are putting Qes on any queue in the subsystem. This manner of operation obtains the maximum processing speed for all work provided to the subsystem, when compared to a non-load balanced queued subsystem handling ADM requests.

Queue Element (QE)—FIG. 3:

FIG. 3 represents a QE which is a control block stored in protected electronic storage associated with a subchannel.

The QE used by this invention may be a control block associated with a particular subchannel (pointing to a subchannel), or the QE may be the subchannel itself, which is a control block having pointer fields for being chained into various types of queues.

Each QE contains the following fields in this embodiment: "lock", "subchannel ID", "type", "busy ID" (identifier), "Current Q ID" (queue identifier), "Current Q chain PTR", "assigned Q ID", "checkpt Subunit Data", "Channel Program Address", and "status".

The "lock" field is set on to warn other QOPs and CPUs when the QE is being accessed to change one or more of its fields.

The "subchannel ID" field contains the ID number of the associated subchannel.

The "type" field indicates whether the QE is an I/O QE or an ADM QE. If neither, it is not a request that is processed by the QOP subsystem.

The "busy ID" field identifies the QOP which is currently accessing this QE. The "current Q ID" field identifies the current queue containing the QE.

The "current Q PTR" field addresses the queue header of the queue containing this QE; this field is cleared while this QE is not on any queue.

The "Current Q chain PTR" field addresses the next QE in the queue which is to be executed. This field has a special value if this QE is the last QE in the queue. This field is cleared while this subchannel is not on any queue.

The "assigned Q ID" field identifies the QOP queue to which a CPU assigns this QE.

The "Checkpoint Subunit Data" field contains several subfields, including: 1. a valid bit (V) subfield which is set on when all subfields are valid in the "Checkpoint Subunit Data", 2. a CCW (channel control word) subfield containing an address to the current ADM CCW in the current ADM program, 3. an MSB subfield containing an address to a current move specification block (MSB) that specifies subunit move parameters for the current ADM CCW, and 4. a subunits moved subfield indicating the current number of successfully moved subunits for the current MSB. The ADM CCW, and MSB (move specification block) operations are described and claimed in the prior cited application Ser. No. 07/816917. The "Channel Program Address" field in the QE contains the address of the ADM channel program obtained from the ORB of the invoking SSCH instruction. For an I/O request, this field contains the address of the required I/O channel program. For an ADM request, this field contains the address of the required ADM program. The "ADM Program" is a list of ADM CCWs in memory.

The "status" field contains status information for the ADM work unit to be reported to the requesting CPU when the work unit is completed and placed on the interruption queue.

QOP Queue Header—FIG. 4A:

FIG. 4A shows important fields used in each QOP associated queue header. Each queue has a header for anchoring the queue at an address known to all CPUs and QOPs, so that they can access the header whenever they need to access its associated queue. Each QOP queue header contains the following fields which are used in this embodiment: Lock field, enable field, retry count, top Q PTR field and bottom Q PTR field. The lock field is set whenever a field in this header is to be changed. The enable field may be a single bit field which is set on when the associated queue is enabled, and is set off when the associated queue is disabled. The retry count field contains the current number of errors that the associate QOP has encountered in a predefined window in time. The top Q PTR field contains the address of the QE at the top of the associated QOP queue (which is the QE currently having the highest priority in the queue) and is the next QE to be executed in this queue. The top Q PTR field contains its header address when its queue is empty (contains no QE).

The bottom Q PTR field contains the address of the QE which is at the bottom of the queue, which has the lowest priority on the queue, and is the last QE to be executed of the Qes currently on the queue. The bottom Q PTR field is accessed for putting a next QE onto the queue.

Common Queue Header—FIG. 4B:

FIG. 4B shows fields in a header of the common queue (CQ) used by all QOPs in the subsystem. Only ADM QEs are put on the CQ. The CQ header (CQH) contains the following fields used in this embodiment: Lock field, QOPo busy PTR through QOPy busy PTR, top Q PTR and bottom Q PTR.

The lock field is set whenever the CQH is to be changed. Each of the QOPo-QOPy busy PTRs fields respectively contains the address of the ADM QE currently being executed by (and last removed by) the respective QOP. A QE address in the field indicates a busy state for the respective QOP. The content of the respective QOP busy PTR field is cleared (empty) if no QE is being processed by the respective QOP.

The top Q PTR field addresses the QE at the top of the CQ (which is the QE to be next executed in the queue), or it addresses the CQH when the CQ is empty.

The bottom Q PTR addresses the QE at the bottom of the queue, which is the last QE to be executed of the QEs currently on the CQ; and it is the field accessed for putting a next QE onto the CQ.

Figure 5:
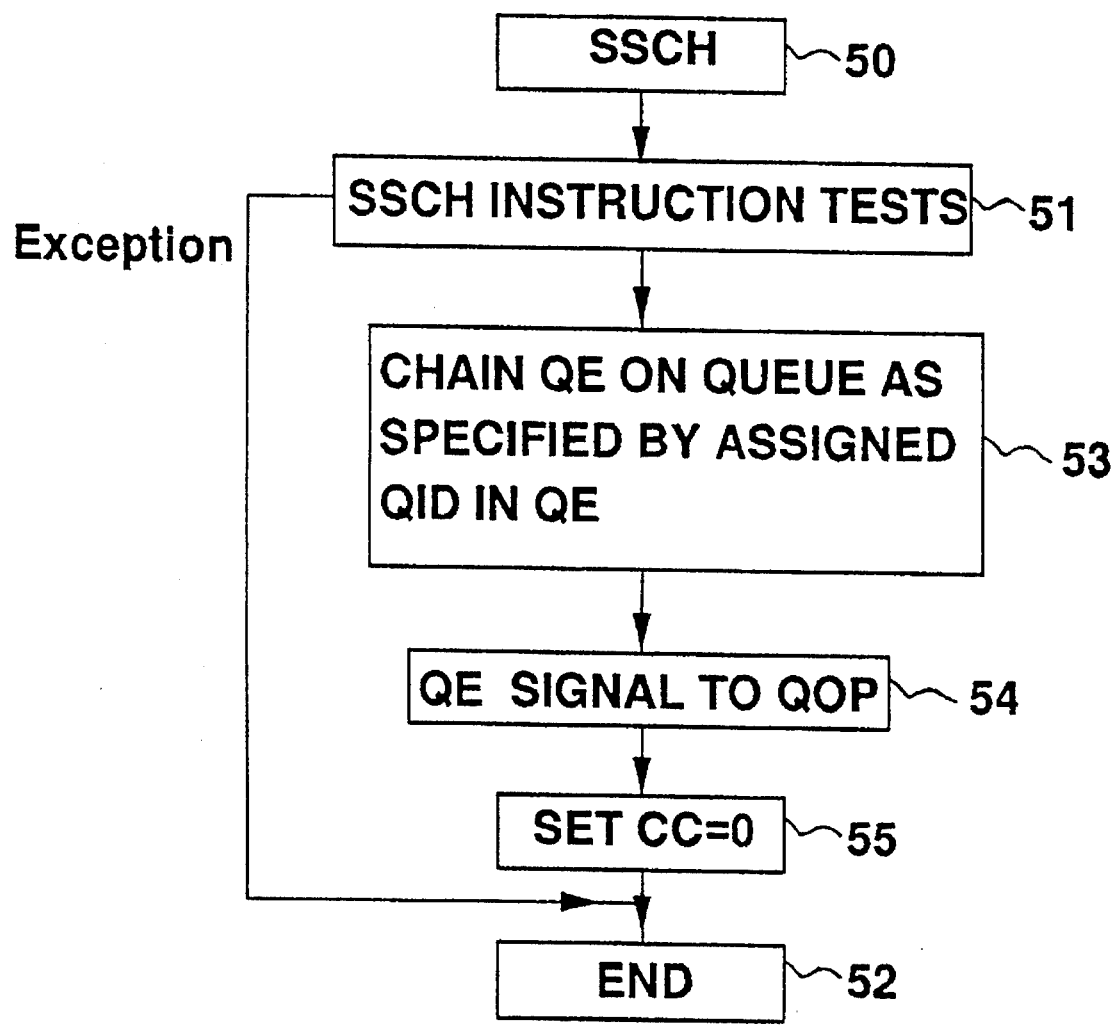
FIG. 5 is a flow chart of a CPU request process that chains a subchannel on an assigned processor queue as a requesting queue element.

CPU Request for Subsystem Service—FIG. 5:

FIG. 5 shows a process used by any CPU to put a unit of work on any of the QOP queues. In this process, a CPU chains a QE into the bottom of a QOP queue determined by the queue assignment in the QE's "current Q ID" field. The CPU request may request an I/O work unit or an ADM work unit.

The first step 50 in FIG. 5 is the accessing by any CPU of an S/390 "start subchannel" (SSCH) instruction to make a request for a unit of work to the QOP subsystem. The first operand of the SSCH instruction specifies the subchannel ID number in general register 1 (GR1). The process in FIG. 5 is similar to the conventional process used in IBM mainframes to start I/O devices, for which a CPU issues an SSCH instruction which chains a specified subchannel as a queue element (QE) into an IOP queue specified in the QE, and signals an IOP (input/output processor) associated with the queue to process the new queue element.

Then step 51 executes conventional SSCH instruction, including exception tests during the execution in the manner done in the prior art. The QE is tested by the microcode for validity and for being operational early in the execution process. If these tests indicate the QE is not valid or operational, the exception path is taken to the process end at step 52. If these tests indicate the QE is valid and operational, the process continues to step 53, in which the CPU chains the QE at the bottom of the queue specified in the "assigned Q ID" field in the QE.

Then in step 54, CPU microcode provides a signal to the QOP associated with the assigned queue that a new QE has been put on its queue. This signal enables the QOP to immediately process this QE if the QOP is not busy doing other work. The subchannel operand of this SSCH instruction is now represented by a QE on the assigned QOP queue.

The CPU execution of the SSCH instruction ends by setting a zero condition code (CC=0) to indicate to the CPU program that this instruction has successfully completed. The CPU program is now free to execute its next instruction which is not required to have any relationship to the SSCH instruction.

Figure 6:
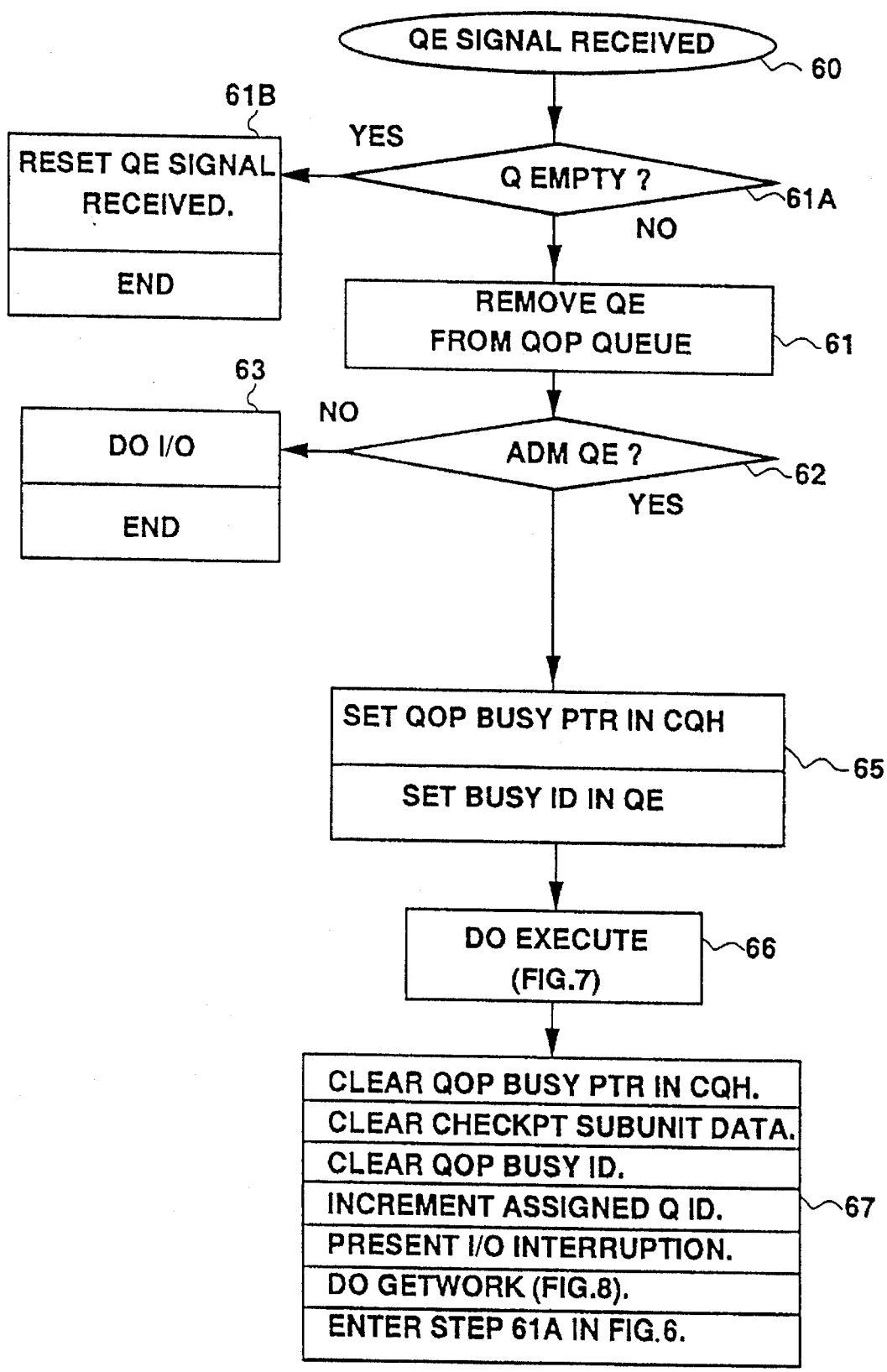
FIG. 6 is a flow chart of a workload balancing process used for each ADM queue element (a subchannel) on any processor queue or on the common queue.

Queue Element Processing—FIG. 6:

The process in FIG. 6 is started for each QOP when it first receives a QE signal from a CPU indicating a work unit has been put on its queue. A QE signal sets on a bistable latch of the QOP that it has received a QE signal, (the latch remains in its on state until the QOP finds its queue empty, which is when the QOP sets the latch off). Step 61A is initially entered to access the queue header and test for the queue empty state by testing if the "top Q PTR" field contains the address of the header. If empty, step 61B resets the QE signal received latch to indicate a no-QE-signal-received state. The "Top Q PTR" field in the header of each queue contains the address of the QE currently at the top of the associated queue. If the content of the "Top Q PTR" field equals the address of its queue header, then the respective queue is empty (has no QE).

If step 61A finds that the queue is not empty, its no path is taken to step 61, which removes the QE subchannel addressed by the "top Q PTR" field. When a QE subchannel is removed from a queue, its "Current Q Chain PTR" field (pointing to the next subchannel in the queue) is written into the "Top Q PTR" field in the queue header to overlay its prior content. The new "Top Q PTR" field points to any next subchannel in the queue which is now at the top of the queue. If there is no next subchannel in the queue, this field points to the queue header. Then, step 62 determines that the removed QE subchannel is an ADM QE or an I/O QE. If it is not an ADM QE, step 63 is entered to handle an I/O QE, and the conventional I/O process is performed. If step 62 determines the removed QE is an ADM QE, the yes path is taken to step 65 to set the QOP's Busy PTR field in CQH, and to set the Busy ID field in this QE subchannel to the identifier of this QOP. The QOP is now busy processing an ADM subchannel.

Then, step 66 is executed, which is a branch to the "Do EXECUTE" process in FIG. 7, which executes the work unit a subunit at a time. After the execution of the unit of work is completed, box 67 is entered.

Box 67 contains a set of housekeeping steps done at the completion of the work unit. These housekeeping steps include clearing (setting off) the "QOP's Busy PTR" field in the CQH. Also, the "Checkpoint Subunit Data" field in the subchannel is cleared and/or its V bit is set off, since no subunit checkpointing is needed after the unit of work has been completed. Box 67 also clears the QOP Busy ID in the subchannel. Also, the assigned Q ID is incremented to the next available QOP which, on the next SSCH, will cause the QE to be placed on a different QOP queue.

Box 67 also has the subsystem generate and send an ADM interruption signal (which is presented to the CPUs as an I/O type of interruption indicating an ADM subchannel) to indicate to the CPUs that a requested ADM data move operation has been completed.

Figure 8:
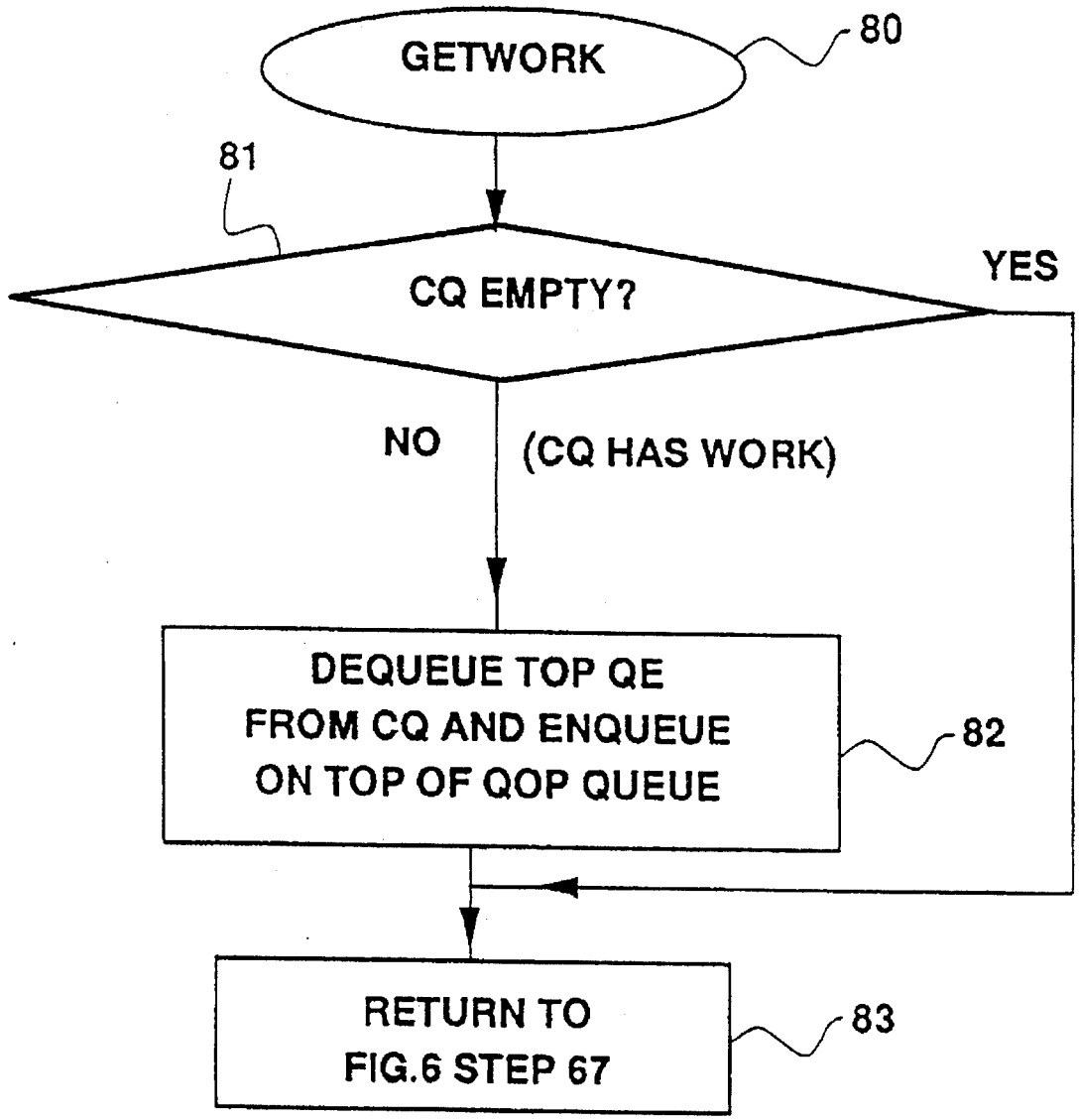
FIG. 8 is a flow chart of a "do getwork" subprocess in the workload balancing process in FIG. 6.

Then, box 67 performs the step "Do Getwork" process shown in FIG. 8, which has the current QOP look at the common queue for its next unit of work, if the CQ has any waiting QE subchannel. Then the process in FIG. 6 is ended.

Execute Process—FIG. 7:

When the "Do Execute" step 66 is reached in FIG. 6, a branch is taken to the execute process in FIG. 7, which controls the execution of the current ADM unit of work (e.g. the movement of its pages of data) represented by the currently removed QE. The execute process also stores checkpointing data in that subchannel's "Checkpt Subunit Data" field and sets it valid for each successfully completed subunit of work.

The "execute" process begins by entering step 70, which checks the state of the validity (V) bit in the "Checkpt Subunit Data". If the valid bit is set off, it indicates the current QE is a new request having no prior checkpointing data in its Checkpt Subunit Data, and the no path to step 72 is taken to initialize the content of that Data by setting it to represent the first subunit of work.

If step 71 finds the valid bit is on, the next subunit to be done is not the first, and the yes path to step 73 is taken. Step 73 then performs to complete the next subunit of work (e.g.

moving the next page required by the current QE request as defined in checkpt data).

Then step 74 performs the checkpointing for that subunit after its execution is completed. This is done by storing in the "checkpt subunit data": 1) the total number of subunits of work performed thus far for the current MSB including the subunit completed by step 73, 2) the address of the MSB specifying the currently completed subunit, 3) the address of the ADM CCW specifying this MSB, and 4) the valid bit is set to its on state.

Figure 7A:
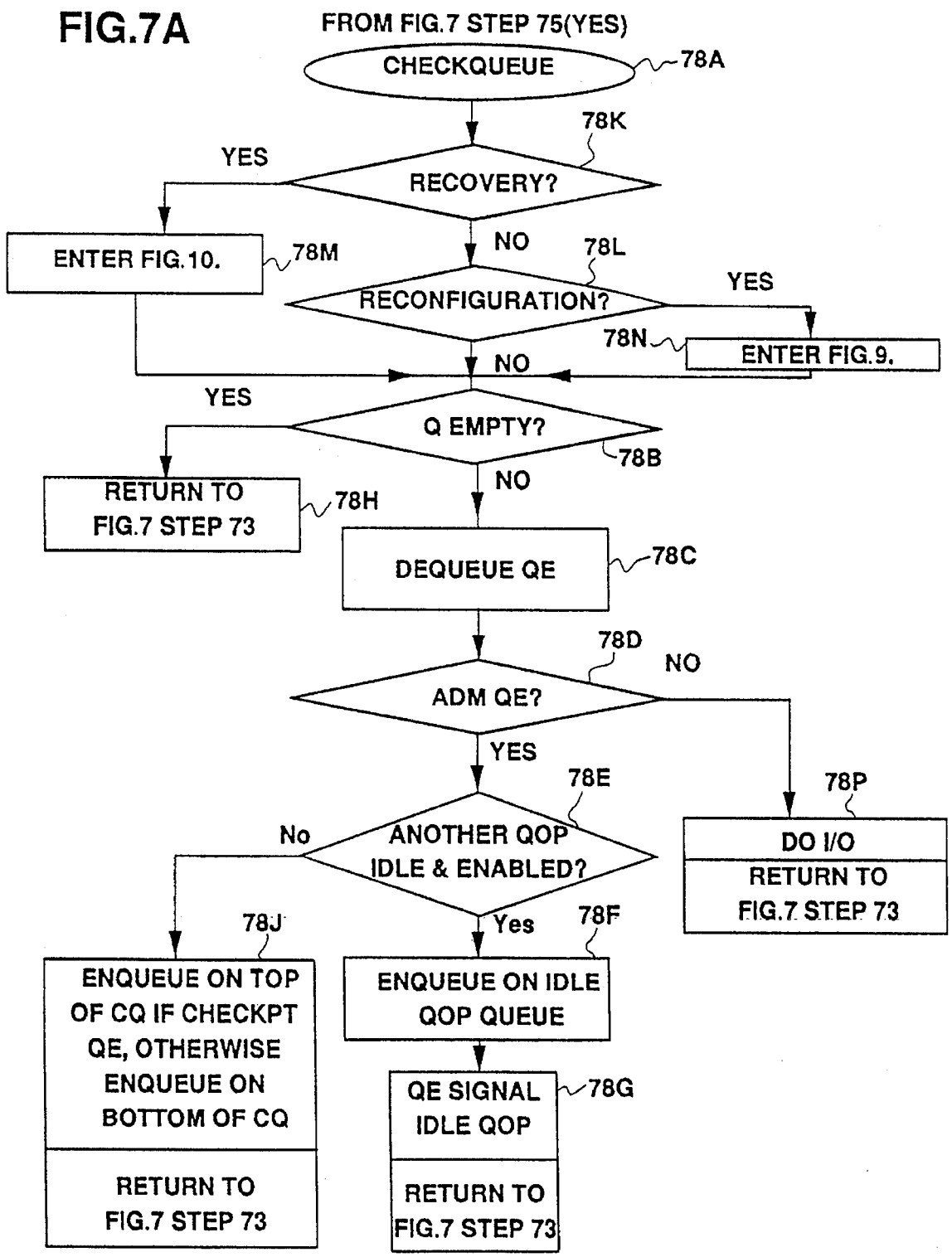
FIG. 7A is a flow chart of a "do checkqueue" subprocess in the workload balancing process in FIG. 7.

The next step 75 tests if there are more subunits of work to be done in the current unit of work. If step 75 detects the last completed subunit is not the last subunit to be done for the current QE request, then more subunits remain to be done; and the yes path is taken back to step 75A to check for more QEs executing checkqueue process (FIG. 7A). Once the QOP queue has been checked and any QEs processed then the processing returns to step 73 to execute the next subunit of work for the current QE followed by step 74 storing its checkpointing data when it is successfully completed. The iteration back to step 73 involves having the ADM program fetch any next MSBs and any next ADM CCWs in the ADM program associated with the current QE, until all of its MSBs are executed for that QE subchannel (representing one CPU request to the ADM). When step 75 detects that the last subunit is completed for the work unit, the no path to step 76 is taken. Step 76 is entered to set the status in the currently executed ADM QE. This Status field of the current ADM QE is set to indicate the successful completion. Step 77 is entered to return to the process in FIG. 6 that called the "Do Execute" process in FIG. 7. The process in FIG. 6 then enters its box 67.

CheckQueue Process—FIG. 7A:

The "checkqueue" process in FIG. 7A is entered at point 78A from the "yes" path from step 75 in FIG. 7 to check for other work pending. Step 78K tests for a recovery signal pending and branches to step 78M to process the recovery action if this processor becomes the recovery processor. If no recovery signal is pending, the "no" branch is taken to step 78L, which tests for a pending reconfiguration signal. In step 78L, if a pending reconfiguration signal is active, and this processor becomes the reconfiguration processor, the "yes" branch is taken to step 78N to process the reconfiguration request. If no reconfiguration signal is active, the "no" branch is taken to step 78B.

If either signal is taken by the processor, the signal is tested and set off as one operation so that no other processor will react to the signal. In step 78M, the recovery process (FIG. 10) is called and then the process returns to step 78B in FIG. 7A when complete. In step 78N, the reconfiguration process (FIG. 9) is called and then that process returns to step 78B in FIG. 7A when complete.

The checkqueue process then tests whether the queue of this QOP is empty in step 78B. If it is empty, the "yes" path is taken to step 78H to end the checkqueue process. If it is not empty, the "no" path is taken to step 78C to dequeue (remove) the top QE from that queue. Then step 78D tests if the removed QE is an ADM QE. If not, it is an I/O QE, and the no path is taken to step 78P which performs the conventional I/O process.

If this is an ADM QE, the "yes" path is taken to step 78E to look for another QOP which can perform the dequeued QE request. It is to be remembered that the current QOP is presently busy doing a unit of work which has not been completed when the QOP paused at the end of the last subunit to do the "Checkqueue" process within the execution of the unit of work. Accordingly, the current QOP cannot execute this dequeued QE at this time.

If step 78E finds another QOP idle (because it is not doing any ADM work) and queue enabled, the "yes" path is taken to step 78F to enqueue this removed QE onto the QOP queue of that idle QOP. Then, step 78G has the current QOP send a QE signal to the idle QOP to indicate to the idle QOP that a QE has been put on its queue. A return is then taken back to the execute process in FIG. 7 where step 73 is entered.

If step 78E did not find any idle and enabled QOP, then step 78J is entered which enqueues that QE onto the top of the CQ if it has valid checkpoint subunit data or on the bottom of the CQ if it does not have valid checkpoint data, and a return is then taken back to the execute process in FIG. 7 where step 73 is entered.

Getwork from Common Queue Process—FIG. 8:

When the "Do Getwork" step is reached in FIG. 6, a branch is taken to enter the "getwork" process in FIG. 8 at its step 80. The "getwork" process accesses the common queue header (CQH) and examines its "Top Q PTR" field to determine if the CQ is empty or not. If the CQ is empty (contains no QE), the content of the "Top Q PTR" field contains the address of the CQ header. If no valid address is contained therein, a return is taken in step 83 to step 67 in FIG. 6. But if a valid address is contained therein, step 82 is performed by using that address to dequeue the top QE from the CQ to get the next QE in the CQ, then enqueue that QE on top of the QOP queue.

Step 83 is then performed to enter the process in FIG. 6 at its step 67.

Figure 9:
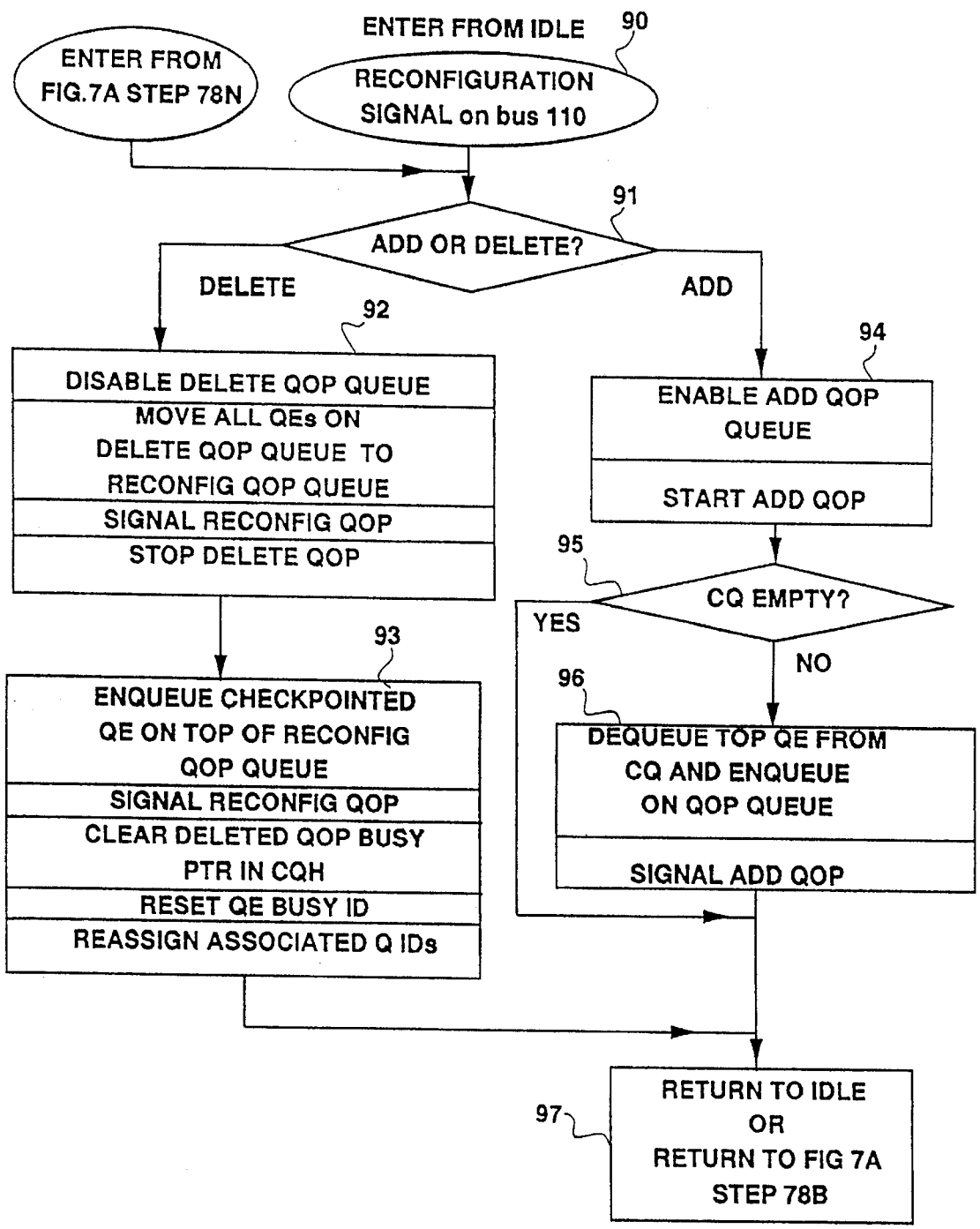
FIG. 9 is a flow chart of a reconfiguration process used by the ADM subsystem.

Reconfiguration Process—FIG. 9:

An ADM subsystem may be reconfigured by a human system operator entering commands to the computer system to remove or add one or more QOPs, each having an associated queue. This may happen, for example, when a multiprocessing system is to be subdivided into two or more independent images or systems. Each QOP must remain part of the reconfigured system portion in which the QOP physically resides. Ongoing and already-queued requests must be handled by that part of the system on which the operating system which initiated them will reside after the reconfiguration. Requests which were in progress on QOP's leaving the system portion on which the currently executing operating system will continue executing must be reassigned to QOP's remaining in that portion. The CQ also remains as part of the remaining portion. If reconfiguration involves the adding of elements previously removed by reconfiguration, the additional QOP's become part of the operational QOP subsystem. The reconfiguration QOP will dequeue a QE from the CQ if available and signal the added QOP. If no QE's are available on CQ, the add QOP waits for a signal.

Each reconfiguration command is provided to the ADM subsystem in the computer system either from a CPU, or from a service processor. The reconfiguration commands are herein called QOP vary off-line and vary-online commands, which may be entered by the operator to remove or add one or more QOPs in a subsystem, respectively. In this embodiment, a QOP vary on-line command adds one QOP to a QOP subsystem, and a QOP vary off-line command removes one QOP from a QOP subsystem.

FIG. 11 represents a QE signalling, recovery and reconfiguration bus 110 which is connected to all QOPs in the subsystem. Bus 110 is also connected to a reconfiguration signalling means 111, through which an operator can provide reconfiguration command signals to all QOPs.

The QOP vary off-line command and the QOP vary on-line command are dynamic commands, which may be issued and executed while the subsystem is in use, and the subsystem may be in any state of operation when a command is received by the QOPs. That is, a vary-offline command to remove a QOP may be executed while that QOP is executing a QE without any disruption of the QOP subsystem being apparent to the rest of the computer system. And that command will not adversely affect the results of the execution of any ADM QOP work unit.

If a vary-offline command occurs to any QOP to delete it from the subsystem while it is executing a work unit, the "checkpointing subunit data" field in the QE is used to properly control the switching of the execution of that QE from the deleted QOP to one that will remain an operational QOP for the same operating system after execution of the reconfiguration command.

When one QOP is added or deleted per reconfiguration command (as is done in this embodiment), an operator may use a sequence of commands in order to add or/and delete as many QOPs as desired. However, it is apparent that a specified number of QOPs may be removed or added by a single reconfiguration command by iterating the reconfiguration process for one QOP a pecified number of times to handle a multi QOP command.

The command information signalled on bus 110 in FIG. 11 specifies: the add or delete operation to be performed, and an identifier for the QOP being added or deleted. The first QOP that finds a reconfiguration signal performs the reconfiguration process. It may be any of the QOP(s) that are to remain operational after the reconfiguration process is completed.

The command information is detected from bus 110 and stored in the identified QOP being deleted (called the add QOP or delete QOP) and in the identified reconfiguration QOP.

Thus, the QOP vary-offline command identifies and designates the QOP being removed as the "Delete QOP", and also involves a QOP remaining in the subsystem as the "reconfiguration QOP".

Any QEs in the queue associated with the Delete QOP are moved from the queue associated with the Delete QOP to the queue associated with the reconfiguration QOP. If the Delete QOP queue is empty, no QEs are moved; but if it is not empty, the QEs of the Delete QOP are moved to the reconfiguration QOP queue. The QE move process is executed by the reconfiguration QOP in the preferred embodiment.

The QOP vary on-line process adds a QOP to a subsystem. The added QOP is physically added to the subsystem before the process in FIG. 9 is executed. The add command identifies and designates the QOP being added, and a reconfiguration QOP executes the add process. The process sets up a header for a new queue associated with the added QOP, which has its ID written in the header by the reconfiguration QOP. The vary-on command does move a QE from the CQ to the added QOP queue if any QE(s) are pending in the CQ. Once the added QOP queue is enabled, FIG. 6, step 67 "increment assigned QID" will begin to automatically assign work to the added QOP queue.

FIG. 9 describes the processing done by the QOP accepting the reconfiguration signal. Step 90 is entered after a QOP vary command is received for adding or deleting one QOP. Then, step 91 is performed to determine from the command operation signal if it is a vary-online command or a vary-offline command.

The delete path to step 92 is taken for a vary-offline command. Step 92 sets the enable field in the Delete QOP queue header to the disable state. Then step 92 moves all subchannels on the Delete QOP queue to the reconfiguration QOP queue and signals the reconfiguration QOP in case it will return to an idle state. And finally step 92 stops the Delete QOP. Then step 93 accesses the "QOP Busy PTR" field of the Delete QOP in the CQ, and reads from that field the address of a "checkpointed subchannel", if any, which was in execution by the Delete QOP when it was stopped by step 92.

The checkpointed QE had been dequeued from the Delete QOP queue to start its execution, and thus is not part of the Delete QOP queue. Therefore, in step 93 the reconfiguration QOP enqueues the checkpointed QE on the reconfiguration-QOP queue and signals the reconfiguration QOP so that the QE will have its execution continued later either by the reconfiguration-QOP or by another QOP on another queue to which the QE is later moved. Then, the reconfiguration-QOP clears the "QOP Busy PTR" field of the Delete QOP in the CQ, resets the QE Busy ID in the QE to remove any association with the Delete QOP, and enters step 97, which if step 90 was entered from the idle state, will return to the idle state. If not, step 91 was entered from FIG. 7A step 78N, and step 97 will return to FIG. 7A step 78B.

In the checkpointed QE, the valid bit in the state of the "Checkpt Subunit Data" determines if reconfiguration occurred during the execution of the QE, which is indicated if the V bit indicates valid checkpointing information exists in that QE. Then, any operational QOP can later use this checkpointing data to complete the QE execution by continuing from the last successful subunit indicated in the checkpointing data until the QE execution is successfully completed. The Delete QOP may then have its power shut off, because its operation is no longer needed in the subsystem. It may then be replaced in the QOP subsystem, or maintenance may then be performed on it while it is either in or out of the subsyste or it may be a part of a different QOP subsystem associated with other portions of the system configured out of the original system. QEs assigned to the associated queue of the delete QOP are reassigned to the queues associated with QOPs remaining in the subsystem to route future work to them.

And finally, step 93 enters step 97 so that the reconfiguration processor can continue its normal operations by returning to its prior state. The reconfiguration process is then ended for the deleted QOP.

Any number of QOPs can be reconfigured off-line by successive vary-offline commands, as long as one QOP is left operational in the system.

The add path from step 94 is taken for a QOP vary-online command for adding a QOP to the subsystem. The added QOP was physically added into the subsystem before the process in FIG. 9 is executed.

Step 94 sets up a new QOP header for a new queue associated with the new QOP being added. Then, step 94 starts the added QOP by turning on power if necessary and enabling its QOP queue. The new QOP is put into an idle state, in which the QOP is waiting either for a signal from a CPU that a QE has been put on its associated queue, or for a signal from another QOP that has moved a QE onto its associated queue.

In step 95, if the CQ contains QE's enter step 96. If the CQ is empty enter step 97. Step 96 will dequeue the top QE from the CQ and enqueue the QE on the added QOP queue and signal added QOP. In step 97, if entered from step 78N the return will resume processing at step 78B. If entered due to reconfiguration signal received when it was in idle state, the return will return to IDLE state waiting for another signal. The subsystem will automatically assign subchannels which will henceforth cause new QEs to be enqueued on the new queue now being added.

Any number of QOPs can be reconfigured on-line by successive vary-online commands.

An alternative way to vary off-line any QOP is by simulating a permanently failing condition for the QOP, and then using the recovery process described in the next section herein to remove the simulated failing QOP.

Figure 10:
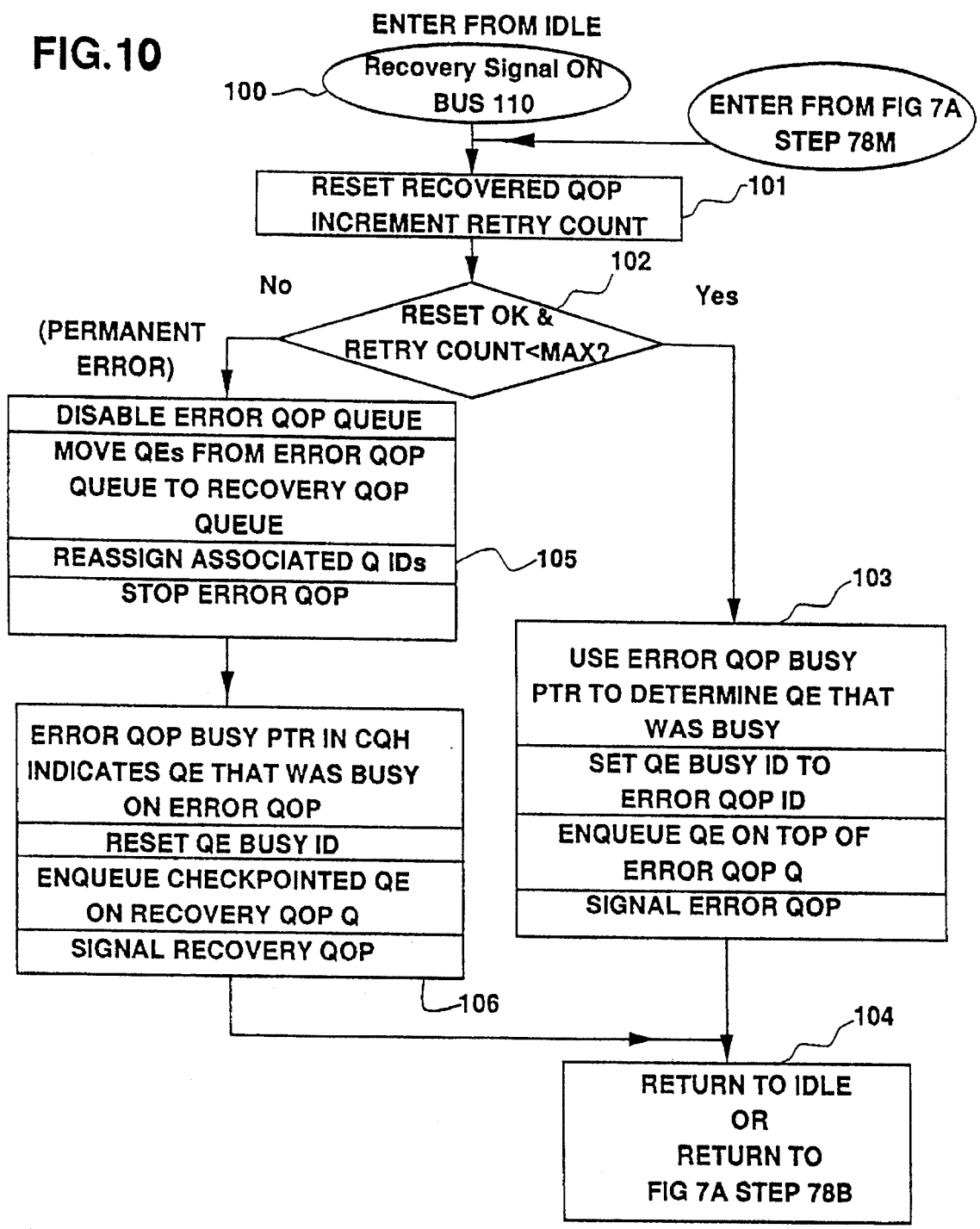
FIG. 10 is a flow chart of a recovery process used by the ADM subsystem.

Recovery Process—FIG. 10:

The recovery process in FIG. 10 depends on each QOP internally having error detection capabilities equivalent to that found in state of the art processors currently in commercial use. The detection of an error condition in a QOP causes the QOP with the error condition to send a recovery signal to the other QOPs on bus 110 in FIG. 11. Sending this recovery signal initiates the recovery process in FIG. 10 at step 100. For example, an error condition may be detected if temporary errors exceed a predetermined threshold count, or if any permanent error is detected in a QOP.

The first QOP in a state for receiving a recovery request signal on bus 110 detects the signal and responds with an acceptance signal on the bus 110 which indicates the accepting QOP will act as a "recovery QOP". The acceptance signal sent by the recovery QOP is recognized by the other QOPs as indicating they can continue with their normal processing operations having nothing to do with these recovery operations.

In step 101, the recovery QOP resets the failing QOP (called the error QOP) and may increment a retry count in the QOP queue header of the error QOP to indicate the number of times an error has occurred to the error QOP.

Step 102 is then entered by the recovery QOP to detect if the reset of the error QOP has failed or if the retry count (in the QOP queue header) has exceeded the predetermined maximum value (N). (The subsystem may use any method, including methods well-known in the prior art, to determine if the error QOP has a temporary or a permanent error condition, which is to repeat the process in which an error condition occurred for N retries. A temporary error is considered a permanent error condition if the error condition remains after its Nth retry of the process or if the reset fails. N is an empirical number set by experience in processor operation, (for example may be 20) and is reset periodically.) This retry operation is initiated by microcode in the recovery-QOP which re-starts the QE process in the error-QOP as shown in steps 103 to 104.

After step 102, the recovery-QOP performs step 103 by accessing the header of the common queue and reading the "QOP Busy PTR" field of the error-QOP, which contains the address of the QE it was processing when the error condition occurred. Then step 103 sets the "busy ID" field in the QE to the error-QOP's identifier to indicate the QE is currently busy with the error-QOP. Then the recovery-QOP enqueues the QE into the error-QOP queue by setting the "Bottom Q PTR" field in the error-QOP queue header to the address of the QE, which chains that QE to the top of the error QOP queue.

Then, the error-QOP is signaled so its processing enters step 61A in FIG. 6 to cause it to continue its normal processing. In step 104, the recovery-QOP returns to normal operation, either step 78B in FIG. 7A or to the idle state to wait for another signal.

If a permanent error condition is determined in step 102, step 105 is entered by the recovery QOP, and it performs the remaining steps 105, 106 and 104 in the recovery process.

Then step 105 is entered from step 102, and the recovery-QOP accesses the header of the error-QOP queue and sets its enable field to indicate the disabled state. The recovery-QOP then moves any QEs on the queue of the error-QOP to the recovery-QOP queue, and stops operation of the error-QOP so that maintenance can be performed on it. QEs assigned to the associated queue of the error-QOP are reassigned to queues associated with operational QOPs in the subsystem. Then in step 106, the recovery-QOP accesses the "QOP Busy PTR" field of the error-QOP in the common queue header to obtain the address of the QE that was being executed on the error-QOP at the time that it failed. This QE is enqueued at the top of the recovery QOP queue and the recovery QOP is signalled after the QE's "busy ID" field is reset, since it is not now being executed.

Finally, step 104 is entered and the recovery-QOP, if it was idle when the recovery signal was received, returns to the idle state. Otherwise, the recovery was called from step 78M in FIG. 7A so it returns to step 78B in FIG. 7A to continue processing its active QE.

The checkpoint information in the QE enqueued by step 106 is used by the recovery process. This QE will be executed in due course by either the recovery-QOP or by another QOP if the QE is moved to another QOP queue. The content of the "Checkpt Subunit Data" field in the QE enables its execution to be re-started at its next subunit after its last successfully completed subunit operation and to continue until the execution of the QE work unit is completed. Many variations and modifications are shown which do not depart from the scope and spirit of the invention and will now become apparent to those of skill in the art. Thus, it should be understood that the above described embodiments have been provided by way of example rather than as a limitation.

We claim:

1. A data move subsystem for use in a data processing system including one or more central processing units (CPUs), electronic memories, and input/output (I/O) devices where the CPUs execute program instructions generating work requests including data move (DM) work requests for moving data within the electronic memories or I/O work requests for moving data between I/O devices and the electronic memories, the data move subsystem being connected to the data processing system and I/O devices and including:

a plurality of data move processors (DMPs) each including control means, each said DMP characterized as being busy or non-busy executing a CPU generated work request;

a plurality of queues, each queue being associated with and accessible to one of said DMPs and including means for receiving one or more queue elements (QEs) from a CPU, each said QE specifying a DM work request or an I/O work request; connecting means, said connecting means providing communication of control signals between said DMPs and transfer of QEs from one of said queues to another of said queues;

said control means of each said DMP including, queue testing means, operative during a DM work request, for detecting the presence of a new QE specifying a DM work request in the associated and accessible one of said queues, means for detecting the presence of a non-busy DMP, and means, responsive to the detection of a non-busy DMP, for transferring the new QE on said connecting means to said queue associated with and accessible to said non-busy DMP.

2. A data move subsystem in accordance with claim 1 further including:

a common queue connected to and accessible to all of said

DMPs;

said control means of each said DMP further including,

DMP status testing means, responsive to the detection of the absence of a non-busy DMP, for transferring the new QE to said common queue, and means, operative at the completion of movement of all sub-units of data specified by a QE, for transferring a new QE from said common queue to said queue associated with and accessible to said DMP.

3. A data move subsystem in accordance with claim 1 wherein said queue testing means of said control means of each said DMP further includes:

means responsive to the detection of a new QE specifying an I/O work request for initiating the transfer of data between the electronic memories and an I/O device.

4. A data move subsystem in accordance with claim 2 wherein:

said common queue includes;

a common queue header including a plurality of status fields, each said status field associated with one of said DMPs for indicating the busy/non-busy status of the associated said DMP, and said DMP status testing means of said control means includes;

means for examining the busy/non-busy indication of all of said status fields in said common queue header.

5. A data move subsystem in accordance with claim 4 wherein:

each said QE includes;

checkpoint data indicating the location of data elements to be moved, indicating the number of sub-units of data to be moved, and indicating the number of sub-units of data successfully moved for the DM work request, and said control means of each said DMP includes;

means for updating the number of sub-units of data successfully moved at the completion of each sub-unit of data moved.

6. A data move subsystem in accordance with claim 5 wherein:

each said plurality of queues includes a queue header, said queue header including an enabled/disabled indicator signalling whether or not the associated said queue and said DMP is operative to receive new QEs;

said control means of each said DMP further includes, reconfiguration signal testing means, operative during a DM work request and prior to operation of said queue testing means, for detecting the presence on said connecting means of a reconfiguration command signal, said reconfiguration command specifying this DMP as a Reconfigure DMP, said reconfiguration command specifying another one of said DMPs and whether said specified one of said DMPs is to be deleted from the system (Deleted DMP) or added to the system (Added DMP), means for setting said enabled/disabled indicator associated with a Deleted DMP to the disabled state, or of an Added DMP to the enabled state, means for transferring any said QE from said common queue to said queue associated with said Added DMP, means for transferring any said QE in said queue associated with said Deleted DMP to said queue associated with this said Reconfigure DMP, and means for setting said status field of said common queue header associated with said Deleted DMP to indicate a non-busy status.

7. A data move subsystem in accordance with claim 6 wherein said control means of each said DMP further includes:

error detection means for detecting error conditions in said DMP and for generating a recovery signal on said connecting means identifying this DMP as an Error DMP;

recovery signal testing means, operative during a DM work request and prior to operation of said queue testing means, for detecting the presence on said connecting means of said recovery signal said recovery signal specifying this DMP as a Recovery DMP;

means for setting said enabled/disabled indicator in said queue header associated with said Error DMP to the disabled state;

means for transferring any said QEs in said queue associated with said Error DMP to said queue associated with said Recovery DMP.

* * * * *